US005657005A

United States Patent [19]

Seebeck et al.

[11] Patent Number: 5,657,005

[45] Date of Patent: Aug. 12, 1997

[54] OPERATION OF A SYSTEM USING A REMOTE CONTROL

[75] Inventors: Carsten Seebeck, Wettstetten; Michael Zirngibl, Neustadt/Donau, both of Germany; Fabrizio Canesi, Monza; Guglielmo Colombo, Casatenovo, both of Italy

[73] Assignees: Temic Telefunken microelectronic GmbH, Heilbronn, Germany; Delchi Carrier SpA, Milan, Italy

[21] Appl. No.: 369,332

[22] Filed: Jan. 6, 1995

Related U.S. Application Data

[63] Continuation of Ser. No. 929,533, Aug. 14, 1992, abandoned.

[30] Foreign Application Priority Data

Aug. 31, 1991 [DE] Germany .......................... 41 28 974.9

[51] Int. Cl.$^6$ ............................ G08C 17/00; H04B 10/00

[52] U.S. Cl. ........................ 340/825.72; 359/143; 371/33

[58] Field of Search ......................... 340/825.17, 825.07, 340/825.72; 358/194.1; 359/142, 143, 145, 875, 182.19; 371/33

[56] References Cited

U.S. PATENT DOCUMENTS

| | | | |
|---|---|---|---|
| 4,241,456 | 12/1980 | Nakagaki et al. | 358/194.1 |
| 4,825,209 | 4/1989 | Sasaki et al. | 340/825.72 |
| 4,914,428 | 4/1990 | Kobayashi et al. | 340/825.72 |
| 5,109,222 | 4/1992 | Welty | 340/825.72 |
| 5,163,055 | 11/1992 | Lee et al. | 371/33 |

FOREIGN PATENT DOCUMENTS

| | | | |
|---|---|---|---|
| 0 320 439 | 6/1989 | European Pat. Off. . | |
| 2 375 674 | 7/1978 | France . | |
| 2 380 606 | 9/1978 | France . | |
| 3 508 562 | 9/1986 | Germany . | |
| 5573157 | 6/1980 | Japan | 371/33 |
| 91/03038 | 3/1991 | WIPO . | |

OTHER PUBLICATIONS

Brodd et al.; "Line Control Procedure for Double-Error Detection and Recovery"; IBM Tech. Discl. Bulletin vol. 17 No. 7 Dec. 1974 (371-33).

"Infrared Remote Control System with Microcomputer" Rüttiger, Elektronik, 20/1981, vol. 30, No. 20, pp. 74-76.

*Primary Examiner*—Eric Coleman
*Assistant Examiner*—Mark H. Rinehart
*Attorney, Agent, or Firm*—Spencer & Frank

[57] ABSTRACT

Initially, control data are transmitted from the pickup of the remote control to the system when the remote control is initially operated. The system responds to the control data and transmits the current system values back to the pickup of the remote control where, after verification of the current system values data received by the remote control pickup, a control command is transmitted by the remote control pickup to the system, with the command causing the system to accept the control data transmitted by the initial operation of the remote control.

18 Claims, 4 Drawing Sheets

OPERATION OF A SYSTEM USING A REMOTE CONTROL

This is a application is a continuation, of application Ser. No. 07/929,533, Filed Aug. 14, 1992 (now abandoned).

DESCRIPTION OF THE PRIOR ART

Systems controlled by remote control—for example TV sets, video cassette recorders, HiFi systems etc.—are usually operated with the aid of cable-type remote controls or without cable in the one-way mode, meaning that when the remote control is operated (by pushbutton), the system reacts immediately. The user must find out for himself—for example from a display on the unit—what data has been set, or must use this display to check that the changes have been made; this is however only possible when there is a good visual contact with the display unit. When the user is some distance away from the unit or when there is no display, no optical return signal whatsoever is possible. In addition, the current display does not always necessarily match the actual status of the system; for example, a change to the unit might be displayed, but not yet implemented due to transmission errors, or an already displayed change might not yet have been made in cases where the changes have a large time constant.

SUMMARY OF THE INVENTION

The object underlying the invention is to improve the operation of systems with remote controls such that the user is always informed of the current status of the system and that operating convenience is increased.

This object is attained in accordance with the invention by a method of operating a system by a remote control, wherein control of the system is in a two-way mode with bidirectional data transmission between the remote control and the system, and wherein control data are transmitted from the remote control to the system when the remote control is operated initially; the system responds to the control data and transmits the current system values back to the remote control, and after verification of the current system values data received by the remote control, a control command is transmitted by the remote control to the system with the command causing the system to accept the control data transmitted by the initial operation of the remote control. Advantageous embodiments are detailed below.

Communication and data exchange between the remote control (or the pickup of the remote control) and the system (the unit) are in bidirectional, two-way mode in accordance with the invention—when the remote control or the pickup is operated, the current data of the system are transmitted back to them; intended changes to the system are not implemented until they have been checked and found to be free of error. This transmission philosophy ensures hat the user is aware of the current operating status of the system at all time during the communication phase, and that incorrect or fictive inputs are avoided.

The timing of the transmission is such that the system is first informed of the user requirements by means of a transmission path—for example in the IR or HF range; the system checks and decodes the received data, and then the same transmission path (return channel) is used to transmit the complete status of the system back to the pickup. The latter evaluates the information received from the system; when the data is error-free, the pickup now transmits an acknowledge command to the system that (only now) tells the control computer of the system to accept the data supplied by the pickup. The current system data can optionally—for example using a customer-specific display integrated into the pickup of the remote control—be made visually accessible to the user and stored in an EE-PROM, for example. In the event of a faulty transmission, an acoustic signal can be given; in addition, an emergency switch can be provided with which standard data or average values can be transmitted to the system in the event of a failure in the remote control. Data transmission within the unit from the receiver part to the connected peripheral, for example a computer, can take place using a serial bus.

Since the user has direct access to all changeable system values as momentary actual values—for example on the display of the remote control, this represents a major increase in convenience when operating the system; in addition, systems or units can now be made available for operation with remote controls where this was not previously possible. The current system status is always shown on the display, thereby not only removing any uncertainty as to the momentary status of the system or current system values, but also largely ruling out fictive or faulty inputs or transmission errors in the event of changes being made, hence considerably improving safety too.

DESCRIPTION OF A PREFERRED EMBODIMENT

Figure 1:
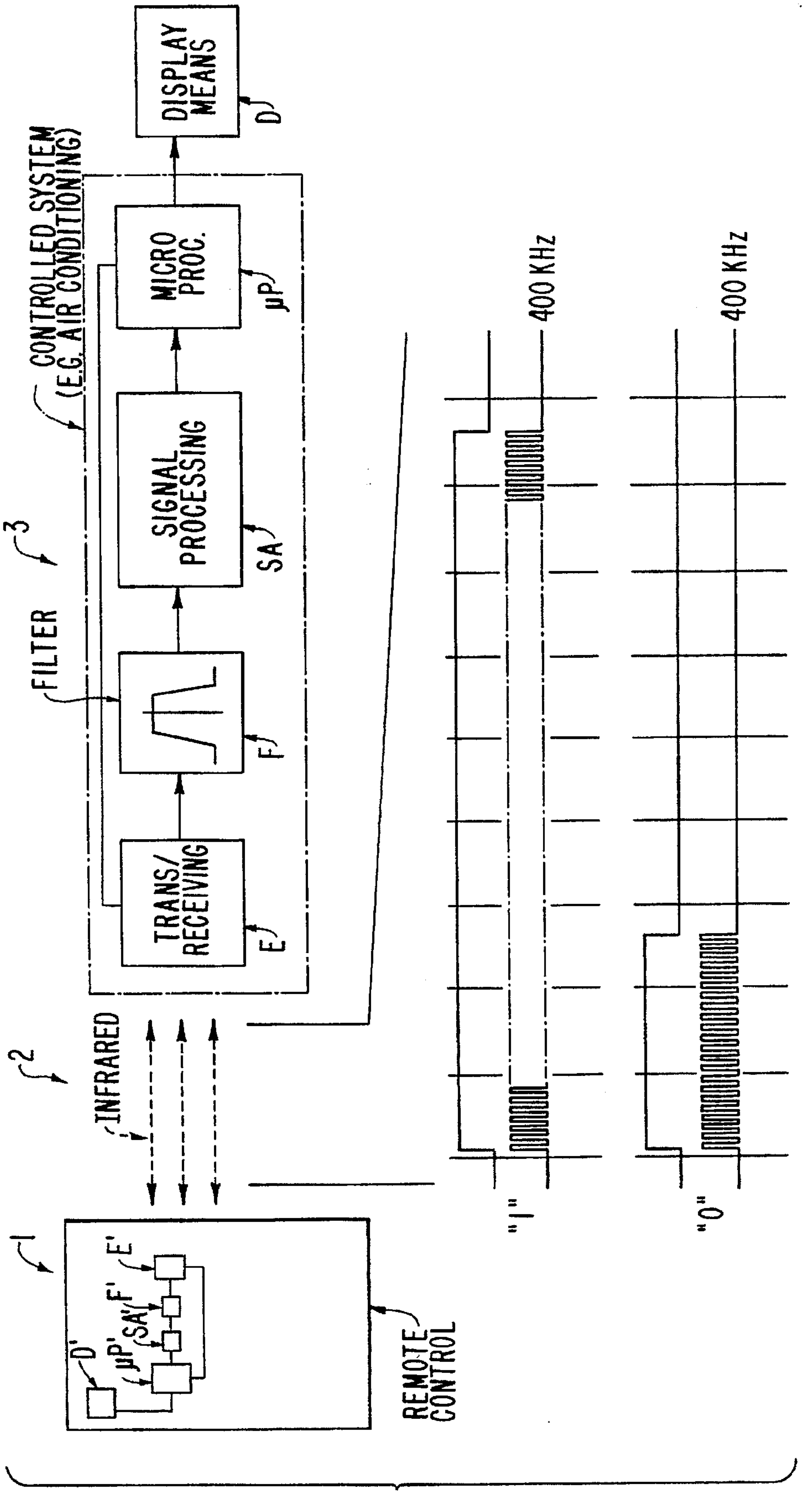
FIG. 1 is a basic block circuit diagram of a system and remote control device according to the invention and additionally showing the form of the transmitted signals.
Figure 3A:
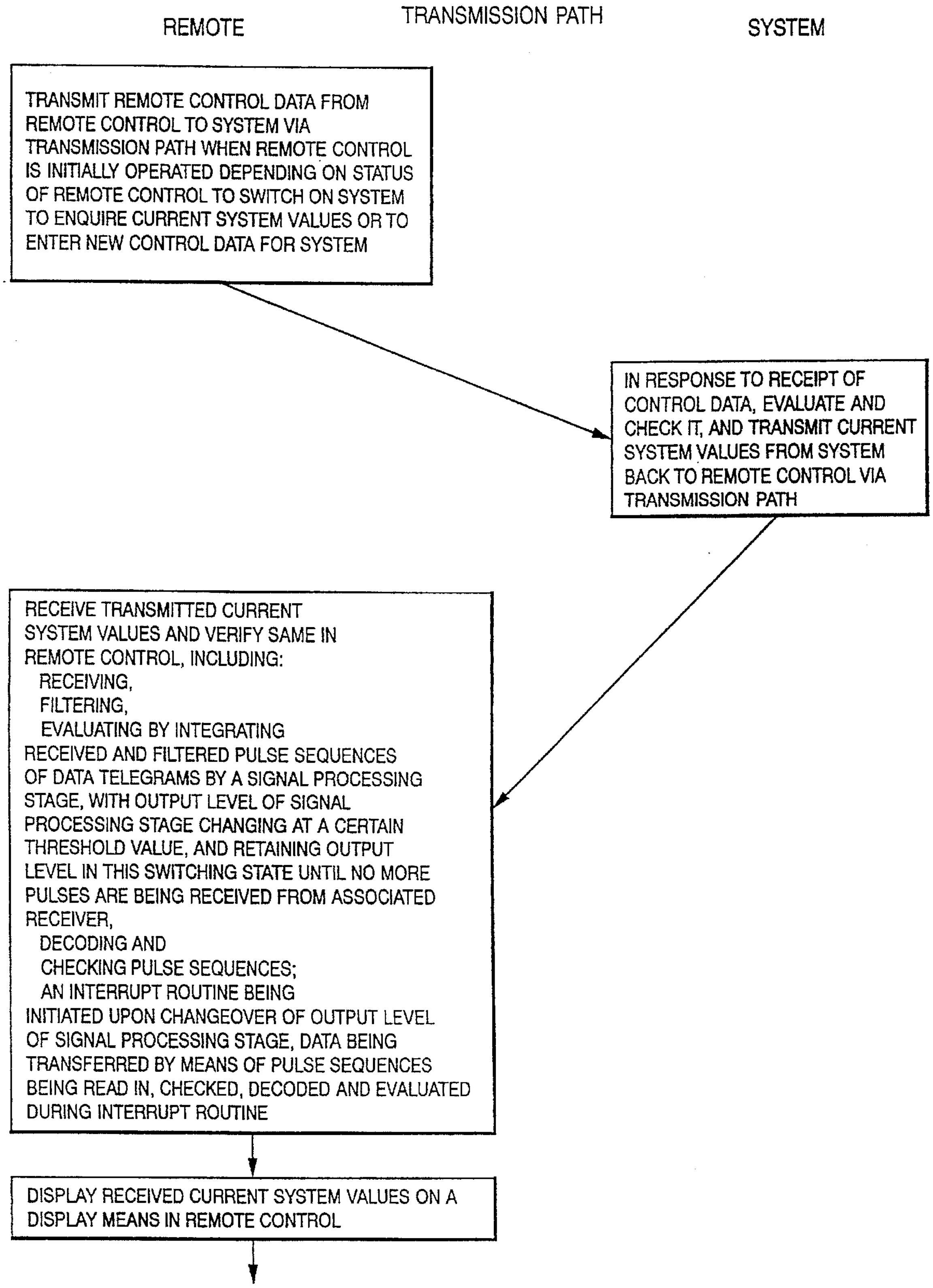
FIG. 3A and 3B are a flow chart of a method according to the invention.
Figure 3B:
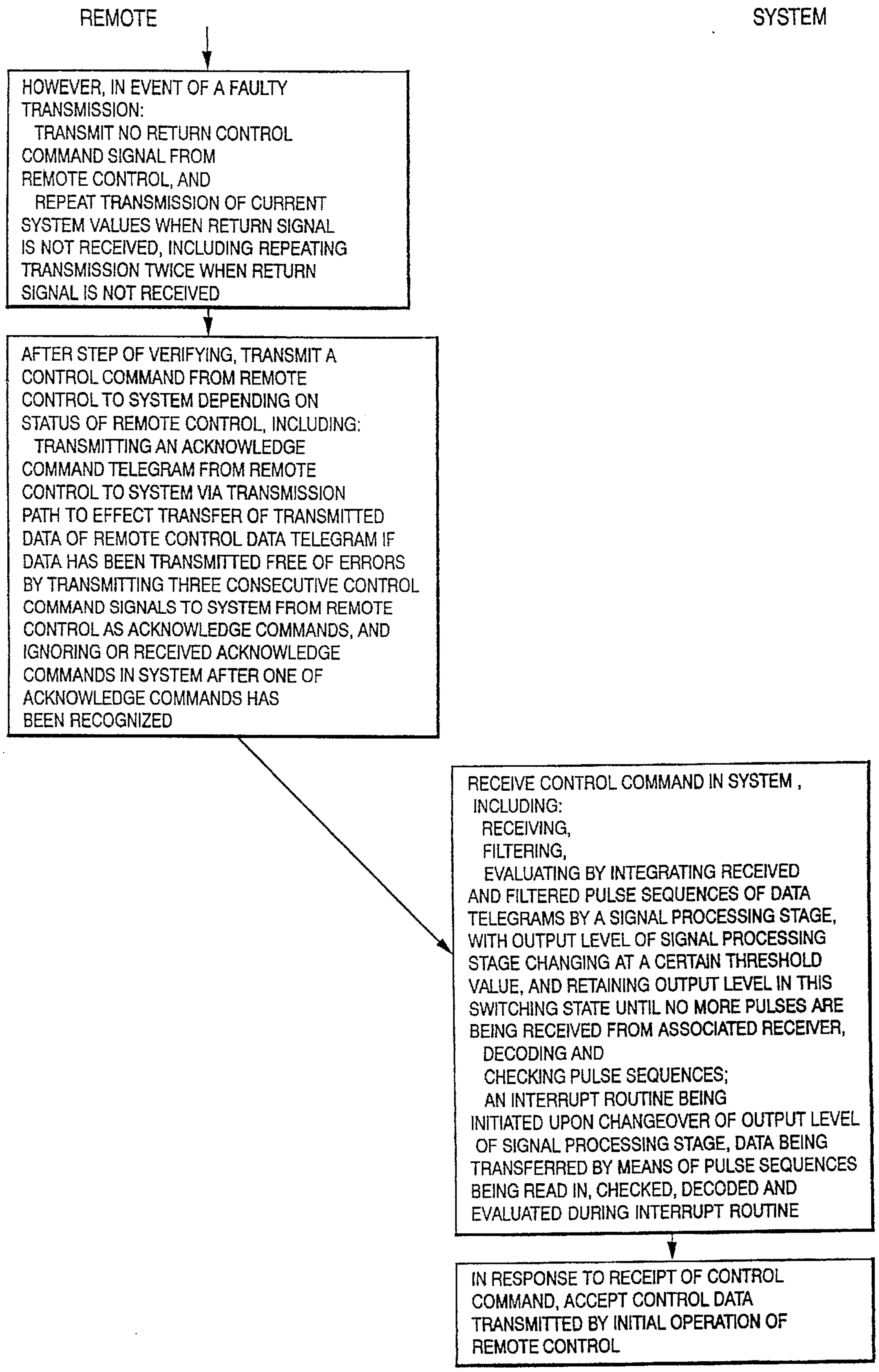

The transmission method—transmission and reception principle plus decoding—is explained in the following on the basis of FIGS. 1, 3A and 3B using the example of an IR transmission. In this case, both the remote control 1 and the system 3 can function as a transmitter or a receiver:

a) Transmission principle:

From the pickup of the remote control 1, one of four possible data items is transmitted to the system 3 via the IR path 2; the appropriate data item is selected here depending on the internal status or momentary status of the pickup. By contrast, only one data item—the current system data or the status of the system—can be transmitted by the transmitter of the system. The carrier frequency of the transmitted data is very high—for example 400 kHz for infra-red transmission. The information units are bit-coded, with the pulse lengths of the carrier frequency pulses characterizing the respective bit value ("1" or "0"). The bit spacing is for example 1 ms, so that a high transmission speed is possible.

b) Reception principle:

The reception telegrams, i.e. the pulse sequences arriving in the receiver part of the pickup E of system 3 or of the remote control 1—in the present example the IR pulses—are filtered using the filter F following an automatic volume control. Accordingly, only frequencies of the transmission frequency range can pass and be further processed: interference signals, for example signals from other IR sources, are effectively suppressed. The signal processing stage SA integrates the received pulses, with the output of the signal processing stage SA switching from High to Low when a minimum number of pulses is exceeded; this output remains in the Low state until no more pulse sequences are being received. An interrupt is triggered by the changeover edge at the output of the signal processing stage SA in the microprocessor µP; the microprocessor µP reads in the level at he output of the signal processing stage SA several times during the interrupt routine (debouncing) and allocates to the reception bit the logic value "0" or "1" depending on the read-in result. During transmission, several check mechanisms—for example forming a check sum, checking the data items (length . . . ), coding—are used to check the data telegram. After recognition of the end of transmission, the information is again tested, decoded and evaluated.

Figure 2:
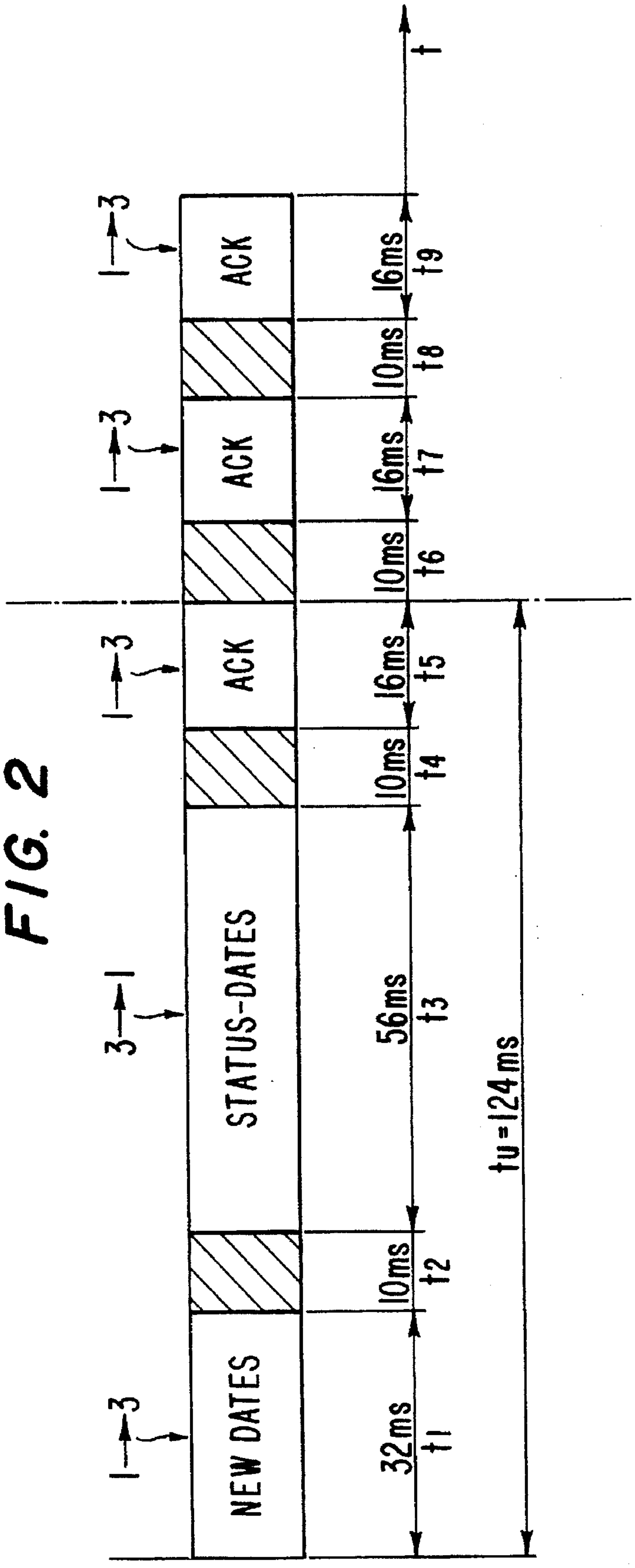
FIG. 2 is a timing diagram for bidirectional transmission scheme according to the invention.

A timing diagram for a bidirectional (infrared) transmission is shown in FIG. 2.

Time interval $t_1$: the transmitting part of the pickup of the remote control 1; transmits—depending on the status—one of four possible data items (1→3): Power-on, Display-update (last current status of system), new control data for the system 3 (system data for changing) or the Acknowledge command. In the embodiment in FIG. 2, for example, new control data is transmitted to the system 3 during the interval $t_1$ (for example 32 ms).

Time interval $t_2$: during this time interval (for example 10 ms), no further pulses may be recognized by the receiver part of the pickup E, of the system 3; at the same time, the received data are checked and the appropriate transmission data of the system 3 are collated.

Time interval $t_3$: system 3 transmits its momentary actual values (status data) to the receiver part and pickup (3→1), with the data being code-optimized—the bit lengths of various transmitted system values are restricted as a result.

Time interval $t_4$: during this time interval (for example 10 ms), no further pulses may be recognized by the receiver part of the system 3; at the same time, the received data are checked in the remote control 1. In the case of error-free reception, the acknowledge command is made ready and the current system data are shown on the display of the remote control 1.

Time intervals $t_5$, $t_7$, $t_9$,: during these time intervals (for example 16 ms each), the pickup of the remote control 1 transmits—three times consecutively—the acknowledge command (ACK) to the system 3. Each of the time intervals $t_7$ and $t_9$ is preceded by an interval $t_6$ or $t_8$ respectively during which, like $t_4$ no data can be received by the receiver part of the system. If one of these commands is received correctly by the receiver part of system 3, all the following acknowledge commands ACK are ignored; the information transmitted during the time interval $t_1$ (new system data) is not transferred to the data memory of the system and stored there until after this time.

The transmission time $t_{Ü}$ is therefore 124 ms, for example, for a fault-free transmission.

The appropriate transmitter of a data telegram waits for up to 15 ms for a reply from the corresponding receiver; if the latter does not transmit a reply—which is the case when the previous data telegram was faultily transmitted or received—the respective transmitter again transmits its data telegram to the receiver. This procedure can be repeated fox up to 3 times, so that the total transmission time is 360 ms at the maximum.

Bidirectional data transmission is preferably used for systems or units without visual contact of the user to the system, or for systems without a display or indicator—for example systems in measurement and control engineering, with the display of verified current system values being of particular advantage here for system monitoring. A typical application here is operation of an air-conditioning system using a two-way infra-red transmission system. In a system of this type, very slow changes to the system status can occur—for example, a temperature change preset by the user (for example from 22° C. to 25° C.) is only implemented very slowly by the air-conditioning system—so that uncertainty as to the real status of the system is possible. With the bidirectional data transmission in two-way mode in accordance with the invention, however, all the current data—for example timer data, temperature set-point value, temperature actual value., filter timer, fan setting, compressor, heater, alarm, test etc.—are transmitted from the air-conditioning system to the user when the remote control is operated, and shown on a display of the remote control. The user can therefore find out the current status of the air-conditioning system at any time.

What is claimed is:

1. A method of operating a system by a remote control, wherein control of the system is in a two-way mode with a bidirectional data transmission between the remote control and the system, said method comprising the steps of: transmitting control data from said remote control to said system when said remote control is initially operated; in response to receipt of said control data, transmitting the current system values from said system back to said remote control; receiving the transmitted current system values and verifying same in said remote control; after said step of verifying, transmitting a control command from said remote control to said system; and receiving said control command in said system and, in response to receipt of said control command, accepting the control data transmitted by said initial operation of said remote control.

2. A method according to claim 1, further comprising the step of displaying the received said current system values on a display means in said remote control.

3. A method according to claim 1, wherein said bidirectional data transmission from said remote control to said system and from said system to said remote control are in the form of data telegrams via a transmission path, wherein said data telegrams are made up of pulses or pulse sequences of a predetermined carrier frequency, and wherein the respective bit value is coded using the pulse length of the carrier frequency pulses.

4. A method according to claim 3, wherein different data telegrams are transmitted from said remote control to said system depending on the status of said remote control.

5. A method according to claim 4, wherein said data telegrams transmitted by said remote control comprise one of power-on information, an enquiry of the current system values, new control data for the system and an acknowledge command.

6. A method according to claim 3, wherein said system transmits only one system data telegram containing the current system values to said remote control.

7. A method according to claim 5, wherein: said step of transmitting control data is initiated upon operation of said remote control to switch on said system to enquire the current system values or to enter new control data for said system, and includes transmitting the appropriate remote control data telegram via said transmission path to said system where it is evaluated and checked; said step of transmitting current system values includes transmitting said system data telegram with the current system values back to said remote control via said transmission path; said step of transmitting a control command includes transmitting said acknowledge command telegram from said remote control to said system via said transmission path to effect transfer of the transmitted data of said remote control data telegram if the data has been transmitted free of errors.

8. A method according to claim 7, wherein the respective steps of receiving by said system and by said remote control include the sequential steps of receiving, filtering, evaluating, decoding and checking the pulse sequences of the respective data telegrams with the aid of a respective series arrangement of a receiver, a filter element, a signal processing stage and a computer, respectively.

9. A method according to claim 8, wherein said step of evaluating includes integrating the received and filtered pulse sequences of said data telegrams by said signal processing stage, with the output level of said signal processing stage changing at a certain threshold value, and retaining said output level in this switching state until no more pulses are being received from the associated said receiver.

10. A method according to claim 9, further comprising initiating an interrupt routine upon changeover of the output level of said signal processing stage, with the data transferred by means of pulse sequences being read in, checked, decoded and evaluated during said interrupt routine.

11. A method according to claim 10, wherein the respective said computer comprises a respective micro processor, and wherein said transmitted data are stored in an associated respective said microprocessor.

12. A method according to claim 1, wherein: said bidirectional data transmission takes place in alternating time intervals, with each said time interval in which data transmission takes place is followed by a time interval in which no data may be received by an associated receiver of said remote control or of said system.

13. A method according to claim 1, wherein said step of verifying further includes in the event of a faulty transmission, so that no verification can be found, transmitting no return control command signal from the remote control, and further comprising the step of repeating the transmission of the current system values when said return signal is not received.

14. A method according to claim 13, wherein said step of repeating includes repeating the transmission twice when said return signal is not received.

15. A method according to claim 1, wherein said step of transmitting a control command include transmitting three consecutive control command signals to said system from said remote control as acknowledge commands, and further comprising ignoring other received acknowledge commands in said system after one of said acknowledge commands has been recognized.

16. A method according to claim 1, wherein said data transmission is in the IR range.

17. A method according to claim 16, wherein the carrier frequency for the data pulses is 400 kHz.

18. A method of operating a system by a remote control, wherein control of the system is in a two-way mode with a bidirectional data transmission between the remote control and the system, said method comprising the steps of:

transmitting control data from said remote control to said system when said remote control is initially operated;

in response to receipt of said control data, transmitting the current system values from said system back to said remote control;

receiving the transmitted current system values and verifying same in said remote control;

after said step of verifying, transmitting a control command from said remote control to said system; and receiving said control command in said system and, in response to receipt of said control command, accepting the control data transmitted by said initial operation of said remote control;

wherein data communication is accomplished using non-line-bound transfer segment and a low data-transfer speed as compared to a line-bound transfer speed; and wherein a transfer frame for a successful transfer of data ends after three communication cycles.

* * * * *